Dec. 11, 1956 M. D. ROSS 2,774,000
ORIENTED-STEEL STATOR-CORES
Filed June 29, 1955 2 Sheets-Sheet 1

United States Patent Office 2,774,000
Patented Dec. 11, 1956

2,774,000
ORIENTED-STEEL STATOR-CORES

Malcolm D. Ross, Churchill Borough, Pa., assignor to Westinghouse Electric Corporation, East Pittsburgh, Pa., a corporation of Pennsylvania Application June 29, 1955, Serial No. 518,870

7 Claims. (Cl. 310—216)

My invention relates to an improved method and structure for using oriented magnetic material in the annular stator alternating-current armature-cores of turbine generators or other dynamo-electric machines of large pitch. A number of attempts have been made, in the past, to find a practical method and construction for taking advantage of the reduction in the iron loss which is obtainable by orienting the grain of the magnetic laminations or sheet-material in the direction in which it carries flux, that is, radially in the teeth of the core, and tangentially or circumferentially in the back or yoke part of the core, sometimes referred to as the core proper. The best previously known proposals for oriented-steel stator-cores have used radially oriented tooth-punchings, which were mortised or interlocked in some way with tangentially oriented core-segments which were in the form of modified sectors of an annulus. These previously used interlocking joints for holding the core-assembly together necessarily have to have a certain small, but unavoidable, looseness of fit, in order to keep within practicable manufacturing tolerances, with the result that the double-frequency magnetic forces of the alternating fluxes have been capable of producing a small relative motion between the teeth and the core-punchings, which would not only be very noisy, but would eventually batter the parts to pieces, even with an amplitude as low as one mil at the tips of the teeth.

My invention provides a rigid oriented steel-core structure in which at least some of the teeth-punchings include portions which extend back into overlapping relation with respect to portions of the segmental core-punchings, in combination with a bonding material which effectively prevents any motion at the overlapping bonded parts, other than the motion which is obtainable in different portions of any other integral solid complex shape which is subjected to comparable forces.

Another feature of my invention applies the idea of using a plurality of separately bonded groups or packages of punchings in the economical manufacture and assembly of long stator-cores which are supported by long building-bolts or other keying-members which are carried by the core-supporting frame. While this aspect of my invention is particularly adapted to the use of bonded overlapping oriented punchings, it is also effective in cores using non-oriented magnetic punching-material.

The essential ideas of my invention are shown in the accompanying drawing, wherein:

Figure 1 is a fragmentary axial sectional view through a bonded bundle or group of oriented steel punchings which are used for the annular core of the stator member of a turbine generator having a size which is well up in the largest sizes which are made; the relative thicknesses of the individual punchings being exaggerated for clearness of illustration, and the section-plane being indicated by the line I—I in each of Figs. 2, 3 and 4.

Figs. 2, 3 and 4 are fragmentary transverse sectional views of the bonded punching-unit of Fig. 1, looking at three different punching-layers 2, 3 and 4, as indicated by the section-lines II–II, III–III and IV–IV, respectively, in Fig. 1. Figs. 2, 3 and 4 also show a fragment of the stator-winding, and a fragment of the rotor member of the machine.

Figure 2:
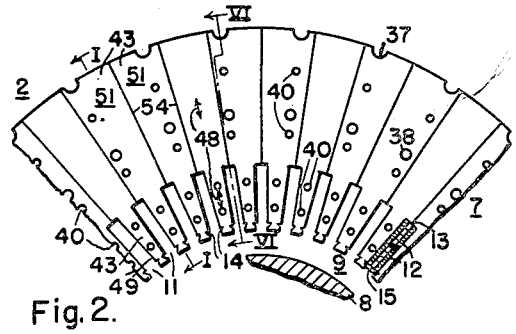
Figure 3:
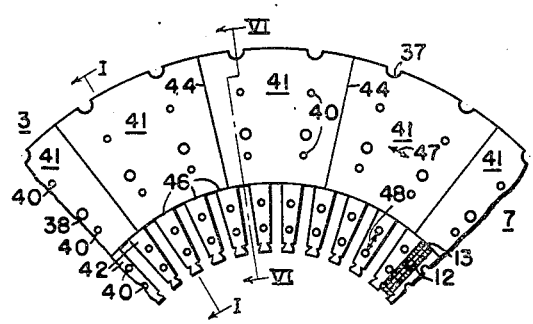
Figure 4:
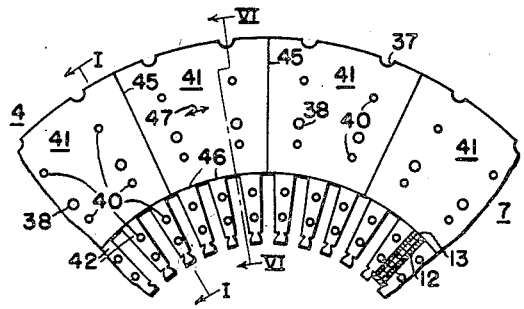

As shown in Figs. 2, 3 and 4, the essential functional or power-producing parts of the illustrated turbine generator consist of a substantially annular stator-core 7, and a rotor-member 8 which is separated from the stator-core by an air gap 9. The annular stator-core 7 has a plurality of winding-receiving slots 11 in its bore, which carry the coil-sides of the stator-winding 12, which is usually a high voltage polyphase winding, having winding-conductors which are directly cooled, or "inner-cooled," as by means of a stack of ventilating ducts 13 inside of each coil-side of the winding. The winding-receiving slots 11 are notched at 14, to receive the usual slot-closing wedges 15, for retaining the coil-sides of the stator-winding 12.

Figure 6:
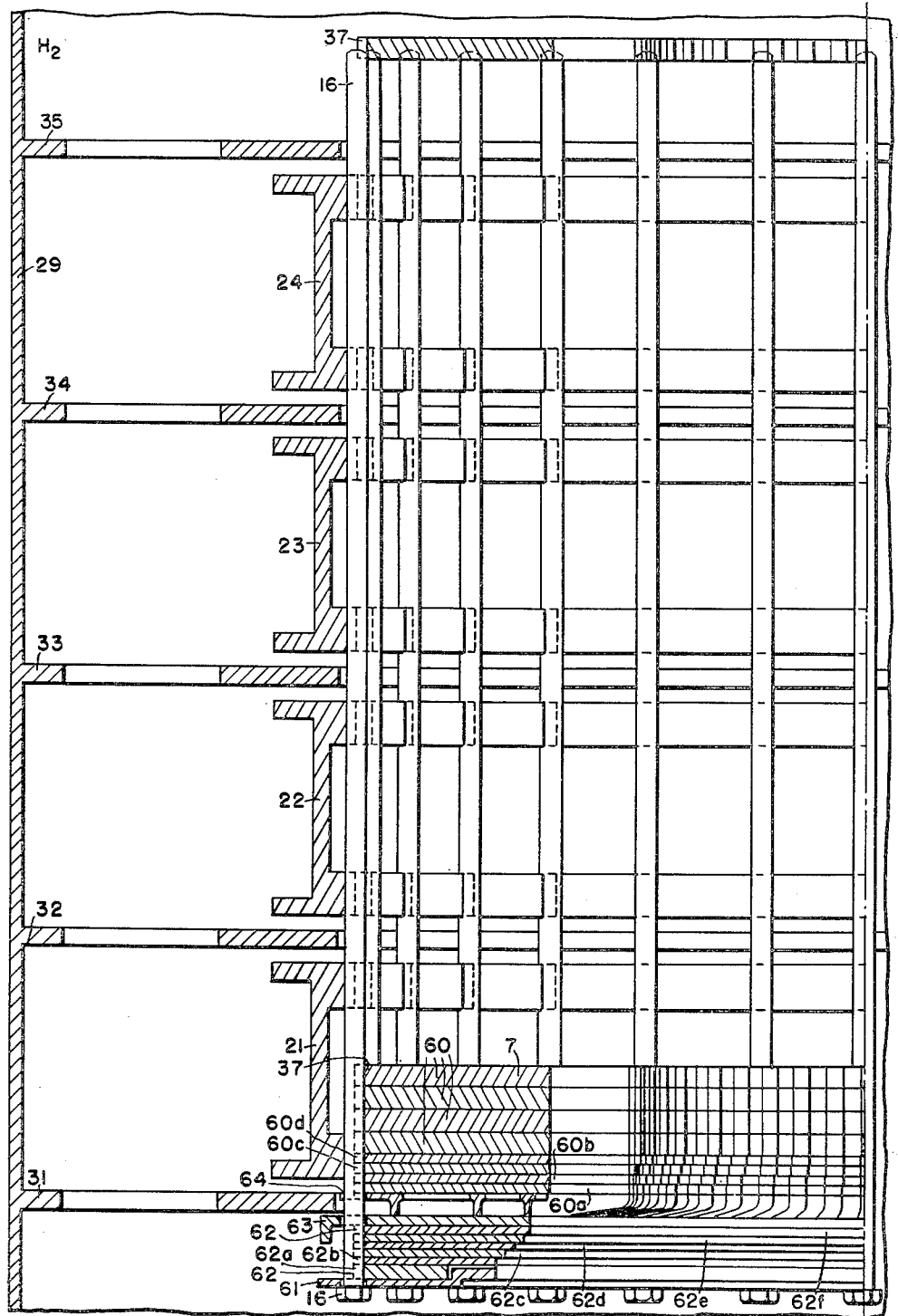
Fig. 6 is a fragmentary sectional view of the stator frame of the machine, shown standing on end during the process of assembly of the stator-core; the section-plane, so far as the stator-core is concerned, being shown by the broken lines VI–VI in Figs. 2, 3, and 4.

As shown in Fig. 6, the stator-core 7, which is here being assembled, is mounted on a plurality of circumferentially spaced, longitudinally or axially extending, peripheral building-bolts 16, or other suitable keying-portions or members, which are carried by the inner peripheries of a plurality of axially spaced inner-frame rings 21 to 24. As further shown in Fig. 6, the stator-member of the machine also includes an outer frame which includes a cylindrical closure-member 29, which is secured around the outer peripheries of a plurality of axially spaced outer-frame rings 31 to 35. It will be understood, of course, that suitable spring-means (not shown), are disposed between the inner and outer frames of the stator assembly, for spring-supporting the stator-core 7 and the core-supporting parts 16 and 21 to 24. The enclosure 29 is usually hermetically pressure-tight, and filled with hydrogen under pressure, as indicated by the symbol $H_2$.

As shown in Figs. 2, 3 and 4, and also at the top of Fig. 6, the annular stator-core member 7 is provided with a plurality of circumferentially spaced, longitudinally extending, semicircular notches 37, or other means for interlocking with the building-bolts 16 of the inner stator-frame, for carrying the rather considerable torque of the machine. The stator-core 7 is also provided with the customary longitudinally extending holes 38 for receiving through-bolts (not shown), for applying and maintaining an adequate compression-pressure on the assembled core. The stator-core 7 is shown also as having a plurality of longitudinally extending ventilating-holes 40 of different sizes, for cooling both the core-proper and the teeth between the winding-receiving slots 11.

In accordance with my invention, the stator-core 7 includes a plurality of stacked punching-layers which are assembled from a plurality of different shapes of oriented magnetic sheet-material, as illustrated in Figs. 1 to 4. Each punching-layer may have a circumferential extent of 360° (or a complete circle), or it could have a circumferential extent of a little more or a little less than 360°, so that successive punching-layers would overlap each other, making successive turns of a fine-pitch helix, with its successive turns or layers pressed together. I have illustrated a construction in which each punching-layer makes a single circumference of 360°, the successive layers being suitably stacked up on each other, as will be described.

In the preferred construction which is shown in Figs. 1 to 4, there are three different kinds of punching-layers, which are built up into a stack or package of punchings in a manner to be described. These three different kinds of punching-layers are indicated by the reference-numerals 2, 3 and 4, respectively, and they are shown in Figs. 2, 3 and 4, respectively. The entire stack of punching-layers is made up of three different shapes and sizes of magnetic sheet-material or laminations, called punchings. In the preferred form of my invention, these punchings are grain-oriented in various ways, as will be described, in order to take advantage of the lower iron-losses which are obtainable by the proper use of such material. The three punching-shapes may be described as, first, a segmental core-punching 41, which is really substantially a sector of an annulus, some of these being shown in Figs. 3 and 4; second, a short tooth-punching 42, some of these being also shown in Figs. 3 and 4; and finally a long tooth-punching 43, some of these being shown in Fig. 2.

In the form of invention shown in Figs. 3 and 4, each of the punching-layers of the types designated 3 and 4 has a back portion, or an outer annular yoke-portion or core-portion, which is made up of a ring of the segmental core-punchings 41, which substantially abut each other in an end-to-end fashion, around the circumference of the core; the abutting core-punching joints being indicated at 44 (Fig. 3) and 45 (in Fig. 4). The butt-joints 44 and 45 of successive layers 3 and 4 are staggered with respect to each other, as is well known. In order to maintain reasonable manufacturing tolerances, these radially extending butt-joints 44 and 45 provide air gaps of the order of 16 mils, more or less, which are practically negligibly small as compared to the air gap 9, which will usually be two inches or more, and also in consideration of the fact that much of the flux bypasses the radial butt-joints 44 and 45 by passing laterally into the next staggered segment or segments of the successive punching-layers 3 and 4.

Each of these punching-layers 3 and 4, in the preferred form shown in Figs. 3 and 4, also has a plurality of the short tooth-punchings 42, which are circumferentially spaced from each other by the several winding-receiving slots 11 of the stator-core 7. In each punching-layer 3 or 4, the outer peripheries of the several short tooth-punchings 42 are in substantial abutment with the inner periphery or bore of the ring of segmental core-punchings 41; making circumferentially extending tooth-to-core butt-joints 46, which provide air gaps of the order of 5 mils, more or less, allowing for reasonable manufacturing tolerances.

Although my invention is not limited, in all of its aspects, to the use of oriented steel or other laminated magnetizable sheet-material, it is particularly adapted therefor and is preferably used therewith. Each segmental core-punching 41 is preferably a piece of oriented magnetic sheet-material having an arcuate space embracing a plurality of winding-receiving slots 11, and having a grain-orientation aproximately in the circumferential direction, which is the direction of flux-travel in the core-punchings, as indicated by the double-headed arrow 47 which is normal to the radius at the center of the segment. Each of the short tooth-punchings 42 is preferably a piece of oriented magnetic sheet-material having a grain-orientation approximately in the radial direction, which is the direction of flux-travel in the tooth, as indicated by the double-headed arrow 48. When I say that the oriented materials has a grain-orientation in a stated direction, I do not mean that it cannot also have a grain-orientation in some other direction or plane, or that the stated direction is necessarily the direction of maximum orientation in the case of a doubly oriented strip.

In order to avoid an unreasonable multiplication of the radial core-segment butt-joints 44, which would be the case if the core-segments 41 were too short, while also avoiding the use of such long core-segments that the tangent (or circumferential flux-direction), at the ends, makes too great an angle with the center segment (which is the direction of orientation), it is desirable that some practical limits be placed on the arcuate or circumferential lengths of the core-segments 41, or at least on most of said segments. I have shown segments 41 of 30° length, but this span is not critical, and it may vary between 15° and 40°, more or less, or these limits might be slightly exceeded, either way, in a very exceptional design.

The punching-layers designated 3 and 4, and shown in Figs. 3 and 4, respectively, are exactly alike (in the illustrated form of embodiment), except that the core-punching butt-joints 44 and 45 in successive layers 3 and 4 are staggered, as shown in Figs. 3 and 4.

The third kind of punching-layer 2, shown in Fig. 2, is made up of a plurality of the long tooth-punchings 43. Each of these long tooth-punchings has a front part 49 which is similar to one of the short tooth-punchings 42, and an integral rear part 51 having a substantially segmental shape (really, a sector of an annulus), having an arcuate span corresponding to one tooth 42 and one winding-receiving slot 11 of the core 7. The rear parts 51 of the long tooth-punchings 43 are in substantial end-to-end abutment with each other, as indicated by the butt-joints 54, so as to form a complete ring or annulus around the circumference of the core, in a manner similar to the core-punchings 41 of Fig. 3 or Fig. 4. The front parts 49 of the long tooth-punchings 43 of any given punching-layer 2 (Fig. 2) are circumferentially spaced from each other by the several winding-receiving slots 11 of the core 7. The radial length or depth of each of the long tooth-punching 43 is substantially (or nearly) equal to the complete radial depth of the core 7, including the teeth 42 and the core proper 41. The long tooth-punchings 43 are preferably made from oriented magnetic sheet-material having a grain-orientation approximately in the radial direction, as shown by the double-headed arrows 48.

Figure 1:
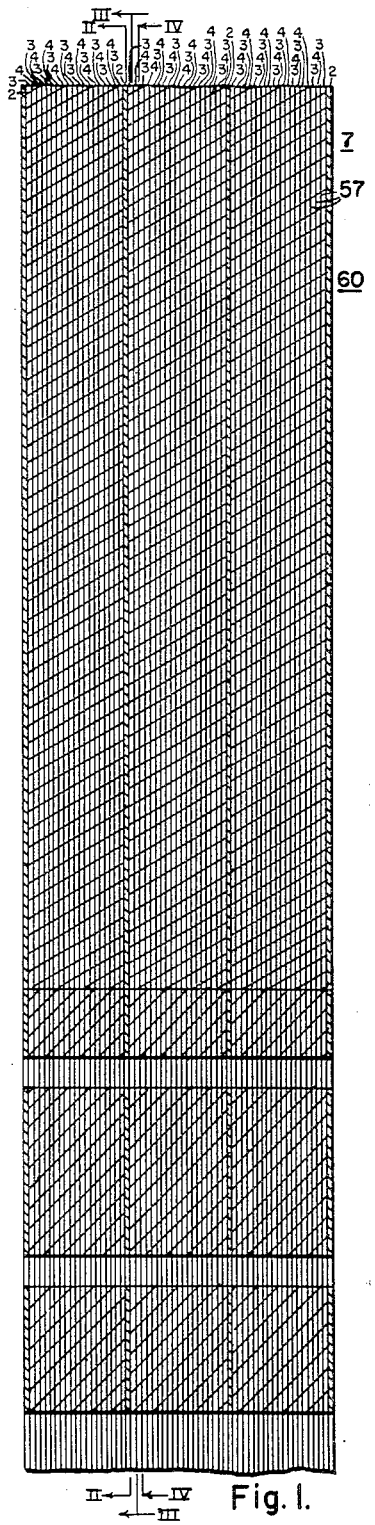

In the preferred form of embodiment of my invention, as shown in Figs. 1 to 4, most of the laminations or punching-layers are in the forms 3 and 4 as shown in Figs. 3 and 4, stacked up in an alternating manner, so as to stagger the core-segment joints 44 and 45. As often as may be necessary, to provide a sufficient bond-strength to hold the stack of short tooth-punchings 42 to the stack of core-punchings 41, a tooth-punching layer 2 is interposed in the stack, as shown in Fig. 1, using the long tooth-punchings 43 of Fig. 2. Thus, some of the tooth-punchings of the completed core include rear portions (such as 51) which extend back into overlapping relation with respect to portions of the segmental core-portions 41 in an adjacent punching-layer (such as 3), so as to provide broad contacting side-surfaces which contribute substantially to the holding-together strength of the core-assembly, or of any bundle or stacked unit of the complete stator-core 7. The overlapping core-punchings 41 provide a strengthening or rigidity-providing means in a circumferential direction, while the overlapping parts of the long tooth-punchings 43 hold the teeth 42 and the core-sections 41 together, thus providing a strengthening or rigidity-providing means in the radial directions.

It is obviously necessary to provide some means for holding the stacked punching-layers 2, 3 and 4 solidly together, in a manner which resists all relative shifting of the contacting or overlapping surfaces of successive layers. This could possibly be accomplished solely by means of a very great clamping-pressure; and in its broadest aspects, my invention contemplates this possibility. However, I believe that much better slip-preventing results may be provided, in a more reliable and more economical manner, by bonding the parts together.

To this end, I omit the insulating coating which is usually provided on the laminations or magnetic sheet-material which has commonly been used heretofore, in the cores of electric machines, and I substitute thin interposed bonding-layers 57, shown as a line in Fig. 1. These bonding-layers are made from a substantially non-conducting bonding-material which is at first sufficiently fluid to be applied, and which is capable of hardening or solidifying, usually under heat and pressure, so as to solidly adhere to the successive punching-layers 2, or 3, or 4, of the core 7, holding the stacked punching-layers solidly together in an integral package or unit 60. The bonding-material 57 also fills, and bonds, the small spaces provided by the radial butt-joints 44, 45 and 51, and the circumferential butt-joints 46, thus reducing noise. There are many available bonding-materials 57 which are suitable for the purpose just described, and I am not limited to any particular kind of such a bonding-material.

The bonding-material 57 makes a tight, solid, bonded joint between all of the contacting surfaces of successive punching-layers of the core, providing the strength of a single solid body, as distinguished from the friction which occurs between the contacting surfaces of stacked separate, unbonded, solid bodies or punchings. I thus provide a core-construction which is strong enough to make it engineeringly feasible to use such a large number of small pieces as I use in the core, and at the same time it is possible to reduce the magnitude of the core-compressing pressures which have heretofore been maintained by the building-bolts 16 and by the through-bolts (not shown) which are inserted through the holes 38 in the stator-core 7. The bonded joints provide mechanical strength and rigidity against double-frequency or 120-cycle vibration due to the forces caused by the alternating magnetic flux in the core. The bonding transmits these double-frequency magnetic forces without relative motion or shifting between the teeth 42 and the core-punchings 41. Without the bonding, the necessary butt-joint gaps between the edges of the abutting parts would not only be very noisy, but would fairly quickly batter the parts to pieces, with amplitudes of a mil or so at the tips of the teeth 42. The bonding permits the machine to last 30 or 40 years, or much more, without coming to pieces. If friction alone were relied upon to provide the necessary rigidity between separate, unbonded core-parts, the results would not in general be as effective as bonding, and the requisite friction-maintaining compression-pressures would frequently be impractically high.

It is possible to build the entire long stator-core 7 of a turbine generator as a single stacked and bonded integral unit, much longer than the unit 60 shown in Fig. 1. However, according to one important aspect of my invention, I prefer to build the stator-core 7 in a number of smaller, individually bonded units, such as the unit 60 in Fig. 1, and assembled in the manner shown in Fig. 6. The stator-core 7 of a dynamo-electric machine, to which my invention is particularly adapted, is quite long, and has a very large total number of sheet-metal punching-layers (such as my layers 2, 3 and 4), having a punching-thickness such that the stacked punching-layers usually run some 70 punching-layers per inch of axial length. Heretofore in building large stator-cores the punching-segments have been individually assembled by hand by keying them onto the long building-bolts 16 of the stator-frame; but these building-bolts are very long because of the great axial length of the stator cores of turbine-generators, and the cost of individually applying each punching-layer to such long keying-members or building-bolts 16 has been a considerable cost-item, which has heretofore been accepted, for many decades, for lack of a practical known way of doing otherwise.

In practicing my invention using bonded punching-layers, I prefer to use a different core-assembling method, in which the complete stator-core 7 is subdivided lengthwise into some 20 to 100, or other convenient number of individually bonded small groups or bundles or units 60, such as are shown in Fig. 1. The punching-layers (such as 2, 3, 4 of each punching-group or unit 60 are individually stacked and bonded, as herein described, before assembling that punching-group in the core-supporting frame (16, 21 to 24). This can be done on a suitable fixture (not shown) outside of the turbine-generator frame, where the assembly is not hampered by the long building-bolts 16.

In the process of assembly, as shown in Fig. 6, the generator-frame is first stood on its end, with the building-bolts 16 extending vertically. Then suitable washers 61 are laid down on the bottom ends of the building-bolts 16. In the illustrated machine, a suitable magnetic end-shield 62 is next keyed onto the building-bolts 16, followed by an end-plate 63 and a finger-ring 64. The magnetic end shield 62 may be laminated as described and claimed in a copending Baudry application, Serial No. 484,613, filed January 28, 1955. In accordance with my invention, I prefer to separately assemble and bond the laminations of the end-shield 62, so that the complete end-shield 62 can be inserted as an integral whole, or it may be assembled as a plurality of bundles 62a to 62f of progressively decreasing bore-diameters as shown, each bundle 62a to 62f comprising a plurality of laminations or punching-layers which are bonded together in an integral unit. The magnetic end-shield 62 and the end-plate 63 usually do not have teeth extending between the coil-sides which will lie within the slots 11 of the stator-core 7.

As shown in Fig. 6, the stator-core 7 is next assembled, on top of the finger-ring 64. This core is assembled as a plurality of separately formed and individually bonded bundles or units 60, eight units 60 being shown in place, while a ninth unit 60 being shown in process of being keyed onto the tops of the building-bolts 16. In accordance with universal practice, the first few bundles, 60a to 60d, of the core-laminations 60 have progressively decreasing bore-diameters, until the normal bore-diameter of the stator core 7 is reached, this being for the purpose of reducing heating due to the end-leakage flux. In accordance with my invention, these first few bundles 60a to 60d are bonded, either as a single unit or package, or as a plurality of separately bonded units or packages.

After the complete stator-core 7 has been assembled, the top end is finished off to match the bottom end, with (not shown) a top finger-ring, end-plate, end-shield, and washers. The whole is then bolted tightly in place, so as to hold the assembled bonded punching-groups 60 together, with an adequate compression-pressure, while the end-plates 63 suitably anchor the stator-core 7, or restrain it against longitudinal displacement with respect to the core-supporting frame.

The assembly-method which is shown in Fig. 6 saves considerable time and labor as compared with the previous practice of assembling each individual unbonded lamination on the building-bolts 16. It will be understood, in Fig. 6, that each bundle or unit, 60, consists of a large number of laminations or punching-layers which are bonded together so as to form a single integral mass as shown, the laminations being bonded together and being too thin to show up on the scale to which Fig. 6 is drawn.

My use of oriented magnetizable punching-pieces, locked together with overlapping contacting surfaces so as to prevent relative motion of the parts, provides a strong, quiet machine which will not quickly shake itself to pieces, thus making it possible to commercially realize the considerable reduction in core losses which is obtainable with suitable orientation of the core-punchings and the tooth-punchings. My use of approximately rectangular core and tooth punchings 41, 42 and 43 also results in a low scrap-ratio, or a reduction in the amount of raw punching-material which is needed, in punching out the various pieces.

Figure 5:
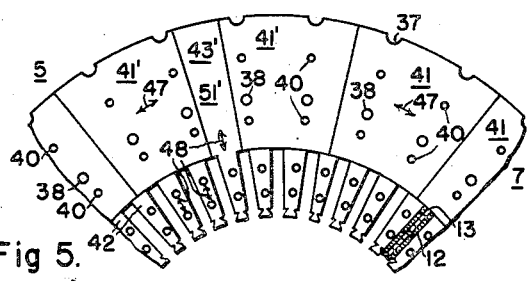
Fig. 5 is a view similar to Figs. 2, 3 and 4, showing a modification of the method of assembly of the different kinds of punchings.

It will be understood that my invention is not limited, in its broadest aspects, to the particular punching-shapes and arrangements which are used in my preferred construction which is shown in Figs. 1 to 4. Thus, as shown in Fig. 5, I could use one, or a few, long tooth-punching 43', having its rear part 51' disposed between two shortened core-punchings 41', in a punching-layer 5, the rest of the layer being like the layer 3 in Fig. 3. Other punching-layers of the stack could then be like Fig. 5, with the long tooth-punchings 43' of different punching-layers coming at different teeth, so that each stack of short tooth-punchings 42 would be secured to the core-punchings 41 through a suitable number of long tooth-punchings 43'; the same staggering of joints, the same bonding, and the same grain orientation being used as in Figs. 1, 3 and 4; but the all-tooth punching-layer 1 of Fig. 1 being now omitted. The foregoing and other changes could be made without departing from the broader aspects of my invention.

I claim as my invention:

1. A dynamo-electric machine having stator and rotor members, with an air gap between them, said stator member having a substantially annular alternating-current armature-core having winding-receiving slots in its bore, said core including a plurality of solidly adhering stacked punching-layers and then interposed bonding-layers of a substantially non-conducting solid bonding-material holding said stacked punching-layers solidly together; said punching-layers being made up of material in the form of separate pieces including segmental core-punchings and radial tooth-punchings of oriented magnetic sheet-material, said tooth-punchings being circumferentially spaced from each other by the several winding-receiving slots of the core, at least some of the segmental core-punchings of at least some of the stacked punching-layers having an arcuate span embracing a plurality of winding-receiving slots and having grain-orientation approximately in the circumferential direction, the tooth-punchings having grain-orientation approximately in the radial direction, at least some of the tooth-punchings of at least some of the punching-layers including portions extending back into overlapping relation with respect to portions of the segmental core-punchings in an adjacent punching-layer for providing bonded side-surface joints which contribute substantially to the bonding-strength of the core-assembly, portions of at least some of the segmental core-portions of at least some of the punching-layers being in overlapping relation with respect to portions of the segmental core-punchings in an adjacent punching-layer for providing bonded side-surface joints which further contribute substantially to the bonding-strength of the core-assembly.

2. A dynamo-electric machine having stator and rotor members, with an air gap between them, said stator member having a substantially annular alternating-current armature-core having winding-receiving slots in its bore; said core including a plurality of stacked punching-layers which are assembled from separate pieces of a plurality of different shapes of oriented magnetic sheet-material, said different shapes including segmental core-punchings having an arcuate span embracing a plurality of winding-receiving slots and having a grain-orientation approximately in the circumferential direction, short tooth-punchings having a radial length equal to that of the winding-receiving slots and having grain-orientation approximately in the radial direction, and long tooth-punchings having a radial length substantially equal to the complete radial depth of the core and having grain-orientation approximately in the radial direction; the assembled tooth-punchings being circumferentially spaced from each other by the several winding-receiving slots of the core; and a means for holding the stacked punching-layers solidly together in a manner which resists all relative shifting of the contacting surfaces of successive layers; each tooth of the assembled core comprising a stack including a plurality of short tooth-punchings and the front end of at least one long tooth-punching; and the back portion of the assembled core comprising a stack including the segmental core-punchings and the back ends of the several long tooth-punchings for tying together the back portion and the several teeth of the assembled core; portions of at least some of the segmental core-portions of at least some of the punching-layers being in overlapping relation with respect to portions of the segmental core-punchings in an adjacent punching-layer.

3. A dynamo-electric machine having stator and rotor members, with an air gap between them, said stator member having a substantially annular alternating-current armature-core having winding-receiving slots in its bore, said core including a plurality of solidly adhering stacked punching-layers and thin interposed bonding-layers of a substantially non-conducting solid bonding-material holding said stacked punching-layers solidly together; said punching-layers being assembled from separate pieces of a plurality of different shapes of oriented magnetic sheet-material, said different shapes including segmental core-punchings having an arcuate span embracing a plurality of winding-receiving slots and having a grain-orientation approximately in the circumferential direction, short tooth-punchings having a radial length equal to that of the winding-receiving slots and having a grain-orientation approximately in the radial direction, and long tooth-punchings having a radial length substantially equal to the complete radial depth of the core and having a grain-orientation approximately in the radial direction; the assembled tooth-punchings being circumferentially spaced from each other by the several winding-receiving slots of the core; each tooth of the assembled core comprising a stack including a plurality of short tooth-punchings and the front end of at least one long tooth-punching; and the back portion of the assembled core comprising a stack including the segmental core-punchings and the back ends of the several long tooth-punchings for tying together the back portion and the several teeth of the assembled core; portions of at least some of the segmental core-portions of at least some of the punching-layers being in overlapping relation with respect to portions of the segmental core-punchings in an adjacent punching-layer.

4. A dynamo-electric machine having stator and rotor members, with an air gap between them, said stator member having a substantially annular alternating-current armature-core having winding-receiving slots in its bore; said core including a plurality of stacked punching-layers of two different kinds; one kind of punching-layer including a back-portion made up of a ring of segmental core-punchings substantially abutting each other in an end-to-end fashion around the circumference of the core, and a plurality of short tooth-punchings which are circumferentially spaced from each other by the several winding-receiving slots of the core, the outer peripheries of the several short tooth-punchings substantially abutting the inner periphery of the ring of segmental core-punchings of that layer; the other kind of punching-layer being made up of a plurality of long tooth-punchings, each long tooth-punching having a front part which is similar to one of the short tooth-punchings and an integral rear part having a substantially segmental shape having an arcuate span corresponding to one tooth and one winding-receiving slot of the core, the rear parts of the plurality of long tooth-punchings substantially abutting each other in an end-to-end fashion around the circumference of the core, and the front parts of the respective long tooth-portions being circumferentially spaced from each other by the several winding-receiving slots of the core; and a means for holding the stacked punching-layers solidly together in a manner which resists all relative shifting of the contacting surfaces of successive layers; each of said segmental core-punchings being a piece of oriented magnetic sheet-material having an arcuate span embracing a plurality of winding-receiving slots and having a grain-orientation approximately in the circumferential direction, each of the long and short tooth-punchings being a piece of oriented magnetic sheet-material having grain-orientation approximately in the radial direction; portions of at least some of the segmental core-portions of at least some of the first-mentioned kind of punching-layers being in overlapping relation with respect to portions of the segmental core-punchings in an adjacent punching-layer of the same kind.

5. A dynamo-electric machine having stator and rotor members, with an air gap between them, said stator member having a substantially annular alternating-current armature-core having winding-receiving slots in its bore, said core including a plurality of solidly adhering stacked punching-layers and thin interposed bonding-layers of a substantially non-conducting solid bonding-material holding said stacked punching-layers solidly together; said punching-layers being of two different kinds; one kind of punching-layer including a back-portion made up of a ring of segmental core-punchings substantially abutting each other in an end-to-end fashion around the circumference of the core, and a plurality of short tooth-punchings which are circumferentially spaced from each other by the several winding-receiving slots of the core, the outer peripheries of the several short tooth-punchings substantially abutting the inner periphery of the ring of segmental core-punchings of that layer; the other kind of punching-layer being made up of a plurality of long tooth-punchings, each long tooth-punching having a front part which is similar to one of the short tooth-punchings and an integral rear part having a substantially segmental shape having an arcuate span corresponding to one tooth and one winding-receiving slot of the core, the rear parts of the plurality of long tooth-punchings substantially abutting each other in an end-to-end fashion around the circumference of the core, and the front parts of the respective long tooth-portions being circumferentially spaced from each other by the several windings-receiving slots of the core; each of said segmental core-punchings being a piece of oriented magnetic sheet-material having an arcuate span embracing a plurality of winding-receiving slots and having a grain-orientation approximately in the circumferential direction; each of the long and short tooth-punchings being a piece of oriented magnetic sheet-material having a grain-orientation approximately in the radial direction; portions of at least some of the segmental core-portions of at least some of the first-mentioned kind of punching-layers being in overlapping relation with respect to portions of the segmental core-punchings in an adjacent punching-layer of the same kind.

6. A dynamo-electric machine having stator and rotor members, with an air gap between them, said stator member having a substantially annular alternating-current armature-core having winding-receiving slots in its bore; said core including a plurality of stacked punching-layers, said punching-layers including a plurality of tooth-punching layers, each of said tooth-punching layers being made up of a plurality of individual elongated tooth-punchings, each of said elongated tooth-punchings being made of a piece of oriented magnetic sheet-material having a grain-orientation approximately in the radial direction, each of said elongated tooth-punchings having a front part which is a core-tooth bounded by two of the winding-receiving slots of the core, and an integral rear part which has a substantially segmental shape having an arcuate span corresponding to one tooth and one winding-receiving slot of the core, the several rear parts in each of said plurality of tooth-punching layers substantially abutting each other in an end-to-end fashion around the circumference of the core, and a means for holding the stacked punching-layers solidly together in a manner which resists all relative shifting of the contacting surfaces of successive layers.

7. A dynamo-electric machine having stator and rotor members, with an air gap between them, said stator member having a substantially annular alternating-current armature-core having winding-receiving slots in its bore, said core including a plurality of solidly adhering stacked punching-layers and thin interposed bonding-layers of a substantially non-conducting solid bonding-material holding said stacked punching-layers solidly together; said punching-layers including a plurality of tooth-punching layers, each of said tooth-punching layers being made up of a plurality of individual elongated tooth-punchings, each of said elongated tooth-punchings being made of a piece of oriented magnetic sheet-material having a grain-orientation approximately in the radial direction, each of said elongated tooth-punchings having a front part which is a core-tooth bounded by two of the winding-receiving slots of the core, and an integral rear part which has a substantially segmental shape having an arcuate span corresponding to one tooth and one winding-receiving slot of the core, the several rear parts in each of said plurality of tooth-punching layers substantially abutting each other in an end-to-end fashion around the circumference of the core.

References Cited in the file of this patent

UNITED STATES PATENTS

| 2,057,503 | Sawyer | Oct. 13, 1936 |
| 2,470,767 | Ellis | May 24, 1949 |